Aug. 2, 1955          M. E. VALIN          2,714,346

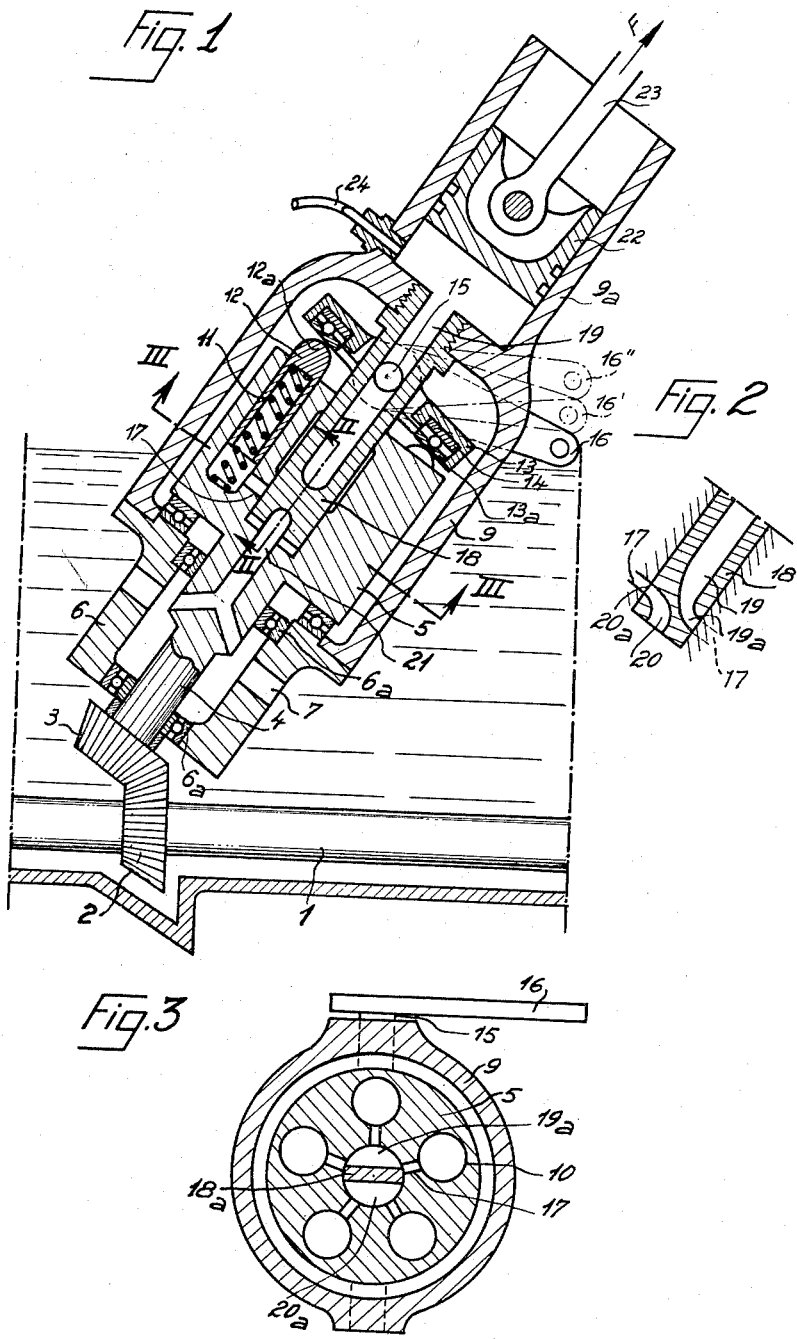

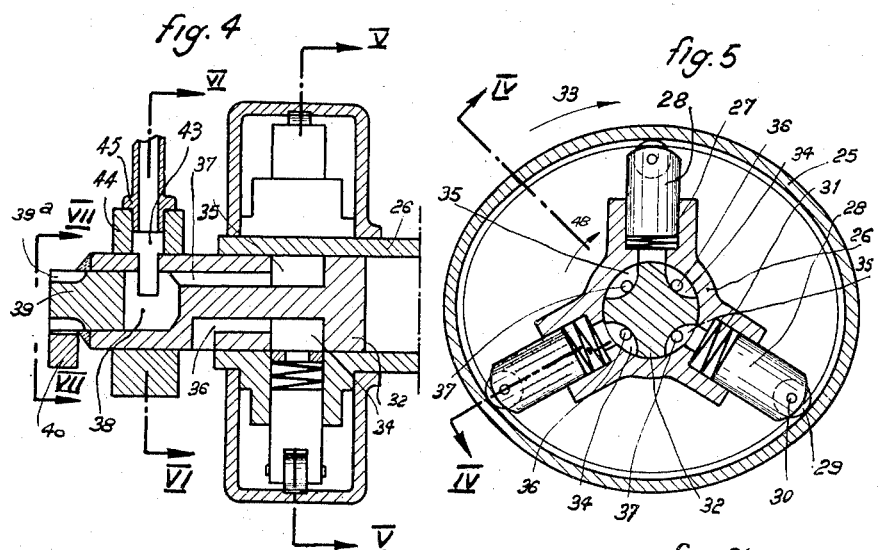
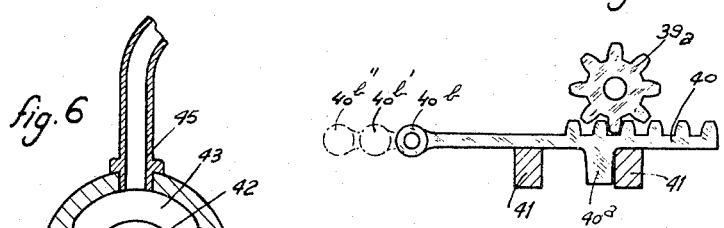
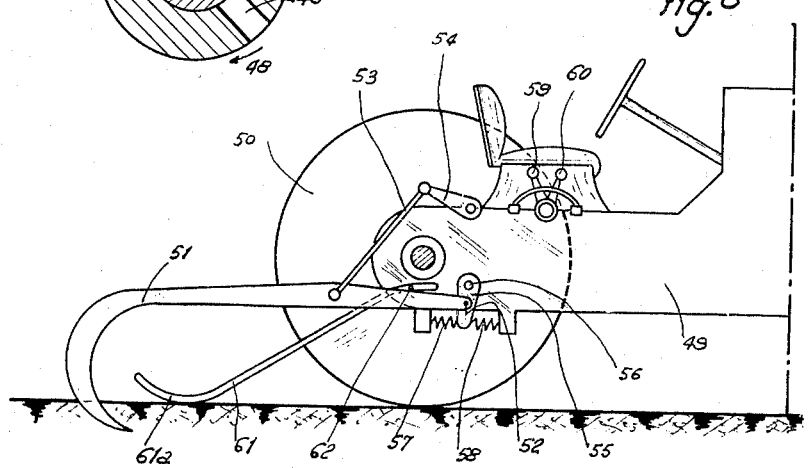

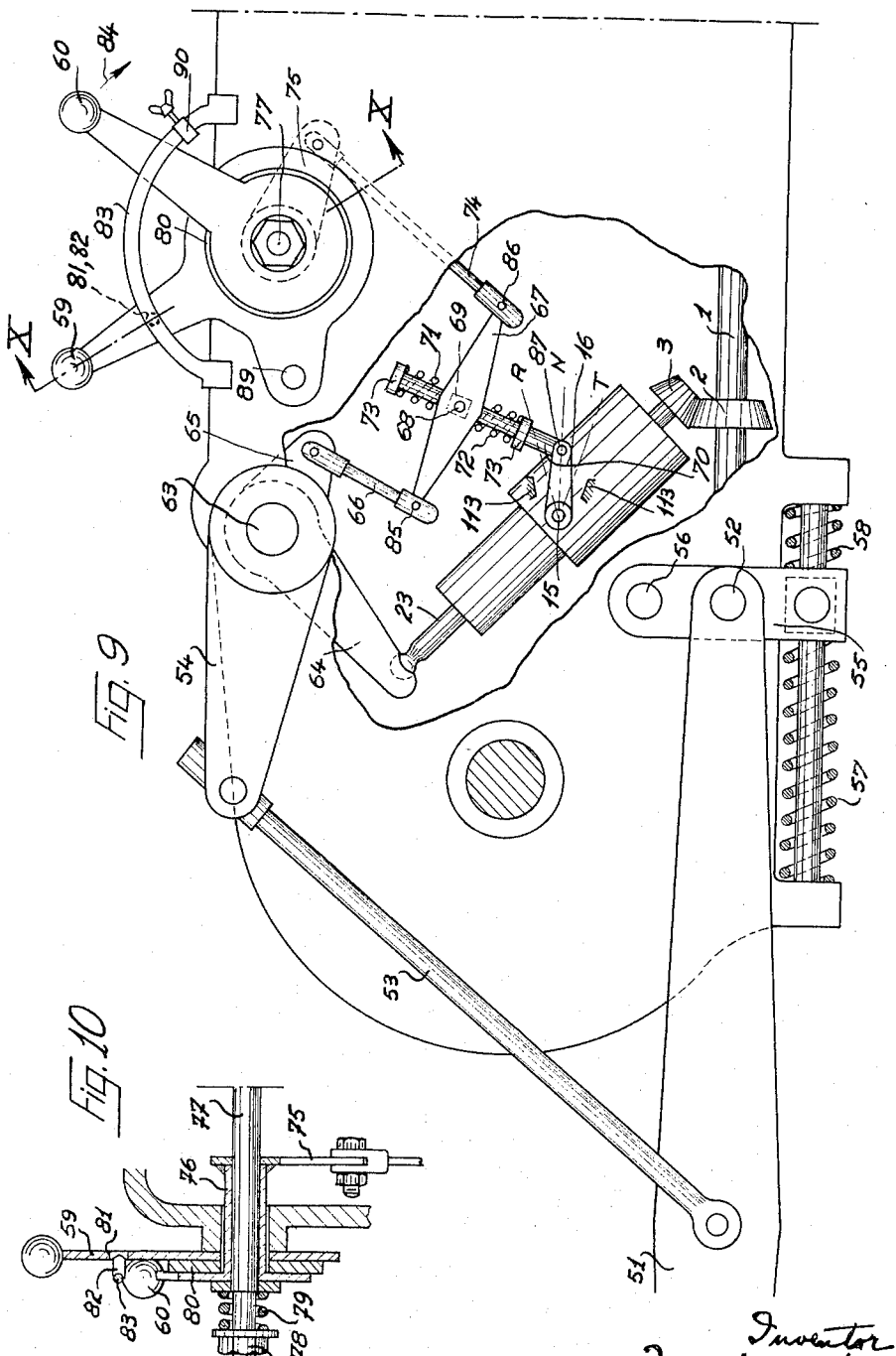

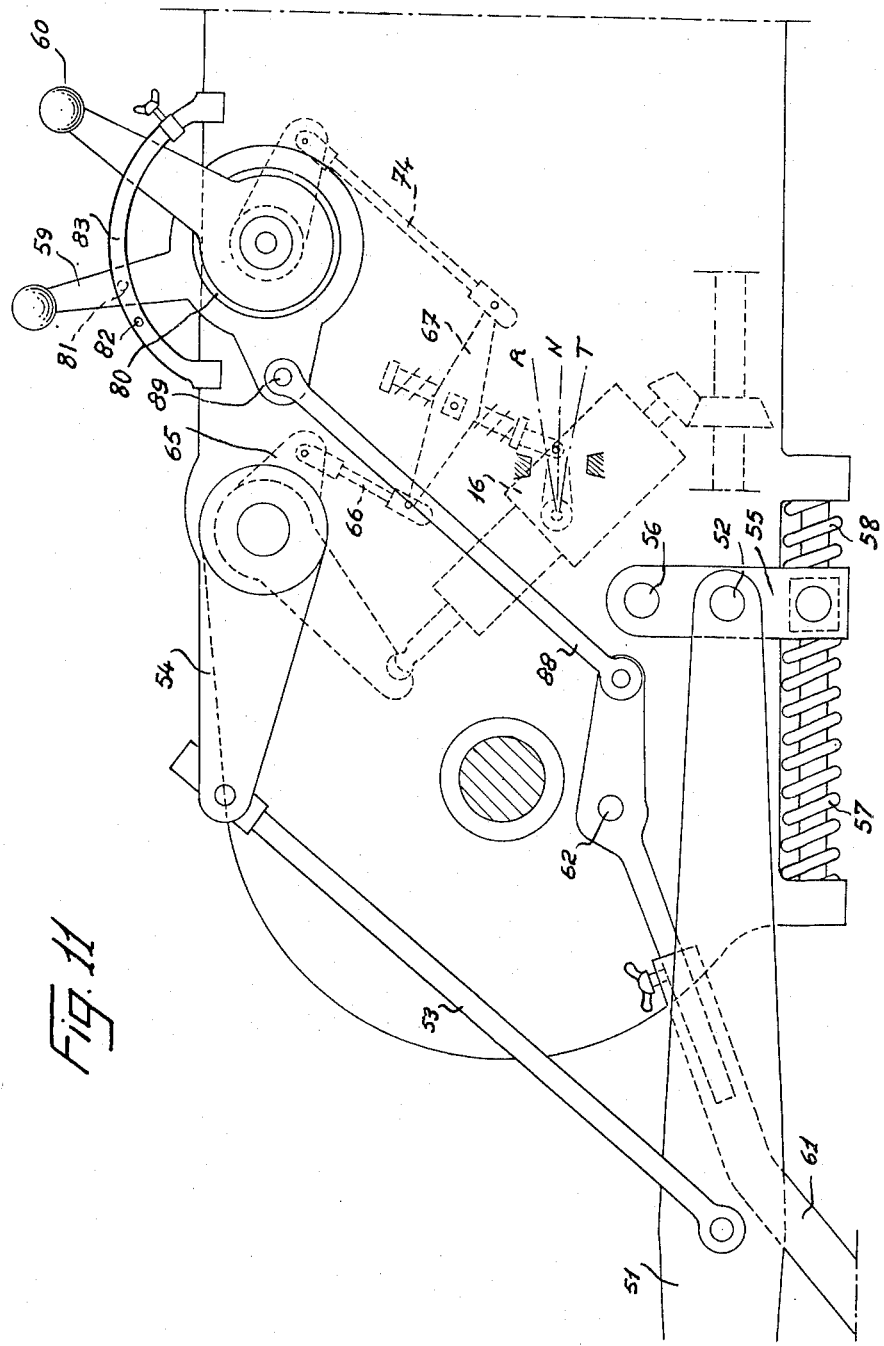

HYDRAULICALLY CONTROLLED FARMING IMPLEMENT

Filed May 2, 1952          5 Sheets—Sheet 5

Inventor
Maurice E. Valin
By Stevens, Davis Miller & Mosher
his attorneys

United States Patent Office 2,714,346
Patented Aug. 2, 1955

2,714,346
HYDRAULICALLY CONTROLLED FARMING IMPLEMENT

Maurice E. Valin, Versailles, France

Application May 2, 1952, Serial No. 285,733

Claims priority, application France May 4, 1951

3 Claims. (Cl. 97—46.07)

This invention relates to power-operated farming implements, and more especially to improved fluid-operated systems for controlling the position of an earth-working tool with respect to the surface of the ground.

The type of agricultural implement which the invention contemplates generally comprises an earth-working tool supported on a frame on wheels, which frame may be that of an agricultural tractor or that of a trailer coupled to such a tractor, and said tool being variably positionable with respect to said frame so as to control the position of the working or active portion of the tool with respect to the earth's surface. The means for controlling tool position have been known to comprise one or more pressure-fluid generators or pumps, driven for example from a power takeoff of the tractor motor, and one or more fluid-operated means such as cylinder-and-piston or hydraulic jack units connected to the pressure-generating means for operation thereby and connected to the tool for adjusting the position thereof. Usually, the hydraulic jack units are made to act unidirectionally on the tool for increasing the elevation thereof above the ground, the force of gravity being relied upon to lower the tool. Means have furthermore been provided for exerting a permanent control on the position of the tool, as by means of a feeler or pilot member trailing over the surface of the ground.

In all such prior hydraulic control systems, tool position was adjusted, whether manually or otherwise, by action on valve means interposed in the hydraulic control piping, so as to control the intake or the delivery of fluid into or from the pump (as by means of by pass or discharge outlets), or both the intake and delivery. In all instances, the pressure fluid generator means utilized have been of the constant delivery or constant displacement type.

While such systems have been successfully used, practical operation has disclosed certain drawbacks therein. Thus, owing to the large capacity with which the pump has to be designed, and the comparatively large operating dead spaces inherent thereto, such systems respond with a certain amount of time lag, detrimental to successful operation. Moreover, the pump usually delivers pressure fluid permanently, resulting in excessive consumption of energy and premature wear of the parts.

It is an object of this invention to provide an improved fluid-operated system for the purpose described which is free of the above mentioned and other drawbacks of prior systems.

Another object is to provide such a hydraulic system wherein the tool will respond to manual and/or automatic control practically instantaneously.

Another object is to provide such a system wherein the consumption of power is reduced.

Another object is to provide a hydraulic system for tool position control of the type described, wherein control is not primarily exerted by the actuation of valve means interposed in the hydraulic piping, but rather by other means to be specified, whereby such control valves may be partly or completely eliminated.

According to the invention, there is provided a hydraulic system for controlling tool position in an agricultural machine, wherein the pressure fluid generator means used comprise one or more pumps of the infinitely variable delivery type having means for varying the rate of delivery or the effective displacement thereof, and means are provided for acting on the said effective displacement varying means for controlling tool position.

In accordance with the invention, therefore, tool position instead of being primarily controlled through actuation of one or more valves in the intake and/or delivery circuits of the pump, is primarily controlled by varying the rate of discharge of the pump itself; depending on the specific type of infinitely variable delivery pump used, the said rate of discharge may be variable either over a range from zero to a maximum value, or over a range from a maximum value in one direction of flow, through zero, to a maximum value in the opposite direction of flow. In the first mentioned instance, that is where according to the invention a non-reversible type of variable-displacement pump is used, a discharge valve may be provided in the hydraulic circuit so as to exhaust the fluid from the hydraulic cylinder means operating the tool and thus cause the tool to be lowered by gravity. Where on the other hand a reversible flow type of variable delivery pump is applied, the tool may be power-operated both in the upward and downward direction, and valve control can be entirely done away with. It is to be understood that the utilization of either of the two above-mentioned sub-types of variable-delivery pumps lies within the scope of the present invention.

Expressions such as variable-delivery, or variable-displacement, or variable-discharge pumps, are used throughout the specification and claims to designate any fluid-pressure generator, which is volumetric rather than dynamic in character (i. e. wherein a definite volume is generated at each operating cycle of the generator), and wherein the effective rate of discharge can be gradually varied over a predetermined range. Such variation is performed without correspondingly varying the operating speed and the delivery pressure, and without having to act upon the flow section of either the intake or the exhaust of the pump, or otherwise controlling the flow in said intake or exhaust as by the use of open center circuit, bypass or the like. As stated, the range over which the rate of delivery may be varied can be from zero to a maximum value in the case of a non-reversible pump, or it may be from a maximum value in one flow direction, through zero and to a maximum value in the opposite flow direction in the case of a reversible pump.

Variable delivery pumps are well known and have been widely used heretofore in fields of engineering foreign to the art of agricultural implement control and the like to which the invention relates. Such pumps can be divided into two sub-types:

A first sub-type comprises pumps wherein the volume generated by relative displacement of the pump components is variable; this category includes in particular vane pumps and radial plunger pumps wherein the eccentricity of the rotor with respect to a stator casing is variable; further included in this category are pumps of the type having pistons disposed in a barrel member cooperating with an angularly adjustable disc member, one of said members being rotatable, (axial plungers pump). Also falling within this class are pumps controlled through axially movable, variable-contour cams, as well as pumps wherein an annular space of adjustable length is adapted to be generated. Pumps of all these kinds are commonly used, in conjunction with any conventional type of hydraulic power units, for the control of machine tools, hydraulic copying attachments, gun-laying and gun-turret control, as well as in certain types of speed- and power-variator devices. In connection with all such prior uses, the contemplated variable-delivery pumps were used in order to benefit from the high accuracy in the rate of discharge obtainable therewith, thus ensuring high fidelity in the response of the receiver device. According to the invention, on the other hand, it is the ease with which the rate of discharge can be varied which is exploited for the purpose of permanently enabling tool position to be controlled.

The second above mentioned sub-type of variable delivery types comprises apparatus wherein the fraction of the generated volume effectively used is varied, while the total generated volume remains unaltered. As examples of this type there may be mentioned piston pumps wherein the pistons are helically slotted and angularly adjustable about their axes, as used in injection motors, and piston pumps of the radial or axial type provided with angularly adjustable distributor member. This last mentioned type of pump, which does not allow of sufficient accuracy in adjustment for use in connection with the previously mentioned fields, is on the other hand perfectly well suited for positioned control of agricultural tools as contemplated in the invention, wherein the precision requirements are obviously of a lower standard than that required in machine-tool control or in gun laying.

Variable delivery pumps of either above sub-types are provided with a control member operable from outside the pump assembly for varying the rate of discharge. In applying a pump provided with such a control member for manually or automatically controlling the position of an earth-working tool supported on a tractor, by means for a hydraulic jack or the like, associated on the one hand with the pump for operation thereby and on the other hand with the tool for adjusting tool position, it is necessary to provide means for actuating the said pump discharge control member, such actuation being manual in case of manual control, and being exerted by any suitable controlling factor in the case of automatic control. Such factor may, for example, constitute the draft force exerted by the agricultural machine upon the tool (automatic draft control) or it may be provided by the displacements of a pilot or feeler member made to contact some reference surface such as the ground or a guiding rail or cable for example.

However, in order that such manual or automatic control of tool position through action on the pump displacement regulator member be operative, according to the invention, it is found that a certain number of essential conditions require fulfilment. In the first place, it is necessary that the pump delivery control member possess a neutral position in which the rate of pump discharge is zero, and that upon movement of said control member in one direction from said neutral position the resulting variation in the rate of discharge will tend to raise the tool, while displacement of the member in the opposite direction from neutral will either reverse the direction of flow thereby tending to lower the tool, or will open a discharge outlet in the hydraulic circuit in order to allow the tool to be lowered under its own weight.

It is further necessary that whenever the control member has been moved manually or automatically, the resulting variation in tool position or in draft force (a factor connected with tool position relatively to the ground), or in any other suitable factor selected as a reference for tool displacement (e. g. oil pressure in the tool-operating cylinder), will react upon the control member to restore it towards neutral. In other words, some sort of follow-up response to tool position is necessary.

Various differential mechanism may be used to produce the desired follow-up effect. One of the simplest of which is the well-known differential link or floating lever mechanism.

Thus, the invention contemplates the use, in achieving the desired follow-up response of the pump delivery control member to tool position or to a factor related to tool position, of a differential mechanism such as a differential lever having a resultant movement output connected with the said control member, and two components movement inputs one of which is connected for operation by the chosen controlling factor, and the other of which is connected for follow-up response to tool position or to said factor related to tool position. The simplest way of achieving follow-up response is to connect said other input of the differential mechanism through a linkage to the tool itself. However, it may be advantageous to use as the follow-up factor the draft force exerted on the tool, as previously mentioned. In this case, the said other differential input would be connected for operation by a dynamometric element responding to said draft force. The dynamometric means may utilise springs, or may be hydraulic or pneumatic in nature; thus, said means may respond to the fluid pressure in the tool-operating cylinder, where said pressure is a function of the draft force. In an advantageous embodiment of the invention, the follow-up action utilizes both direct response to tool position when the tool is above ground surface, and response to draft force when the tool is below ground surface.

As concerns the controlling factor made to act on the first mentioned input of the differential mechanism, this may of course be a manual control member. However, it is also contemplated to use a permanent controlling factor such as may be afforded by the provision of a feeler or pilot member of the previously mentioned type. Preferably, the two controlling factors, manual and automatic, are combined; thus, the manual control member may be connected with said one differential input through a positive linkage while the feeler member may be hooked up thereto through a yieldable connection, such as a friction drive between the manual control lever and a further lever serving to adjust the setting of the feeler.

Preferably, the various above factors acting on the differential mechanism or lever are readily interchangeable, suitable quick-acting couplings or automatic disabling and enabling means being provided in the various linkage connections for connecting the selected ones of said factors for operation according to circumstances. Thus, means will be described whereby the previously described follow-up action is provided by response to draft force so long as the tool is engaging the ground, but is automatically switched to positive response to tool elevation after the tool has been lifted above the ground.

Thus, it is an object of the invention to provide an agricultural tool positional control utilizing a variable delivery pump. Another object is to provide an agricultural tool positional control for raising and lowering thereof which may be made to respond selectively to a variety of factors, including among other possible factors: manual follow-up control; permanent automatic control by means of a feeler contacting a reference surface; and automatic draft control; thereby imparting great flexibility and versatility to the control system. Another object is to provide a farming tool position control system acting on the control member of a variable delivery pump and provided with follow-up means whereby said control member is made to follow-up tool position and/or some factor related to tool position.

Other objects and advantages of the invention will be apparent during the course of the following description.

In the accompanying drawing in which like reference characters are employed to designate like parts throughout the same, Fig. 1 is a diagrammatic lengthwise section of a variable displacement axial plunger pump with a built-in lift cylinder.

Fig. 2 is a partial section according to line II—II of Fig. 1.

Fig. 3 is a section according to III—III.

Fig. 4 is an axial section of a pump of constant displacement but of variable effectively used fraction of the generated volume.

Figs. 5, 6 and 7 are respectively sections according to V—V, VI—VI, VII—VII of Fig. 4.

Fig. 8 is a diagrammatic elevation of the rear part of a tractor carrying a soil engaging tool one of the wheels having been taken off.

Fig. 9 is a large scale elevation of a part of said tractor, partly broken away, the control parts being hooked up for manual control.

Fig. 10 is a section taken along X—X of Fig. 9.

Fig. 11, similar to Fig. 9, shows the control parts equipped with a feeler.

Fig. 12, similar to Fig. 9, shows the same control parts as in the case of automatic draft device.

Fig. 13 is a section taken along XIII—XIII of Fig. 12.

Fig. 14 is an end view shown in the direction of arrow XIV of Fig. 13.

Referring first to Figs. 1, 2 and 3, there is shown a variable delivery pump assembly driven from a shaft 1, which may be the power takeoff shaft of a tractor. Secured on the shaft 1 is a bevel pinion 2 meshing with a bevel pinion 3 carried at the end of a shaft 4 having the barrel 5 of an axial plunger pump secured thereon, or integrally formed therewith, as shown. Shaft 4 is journalled in ball bearings 6a in a lower pump casing member 6. The casing member 6 is formed with ports 7 for free flow of liquid therethrough and is immersed in a tank or sump containing a supply of liquid up to a suitable level therein, as shown.

Assembled to the lower casing member 6 is an upper casing member 9 having an extension 9a integrally projecting from the top thereof to define a hydraulic jack cylinder. Pump barrel 5 supported within casing member 9 is formed with an odd number of longitudinally extending, circumferentially-spaced cylindrical chambers 10 each slidably receiving therein a piston member 12 urged in an upward direction by a related spring 11 acting between the piston member and the bottom of its chamber 10. The projecting upper ends 12a of the pistons 12 are adapted to engage the under face of a freely rotatable race 13a of a ball thrust bearing 13 secured on an orientable disc 14. Disc 14 is journalled by a pair of diametrically opposite pins 15 extending therefrom in suitable bearings formed in casing member 9. Secured to the outer end of one of the journal pins 15 outside the casing member 9 is a lever arm 16 adjustment of which will adjust the angular inclination of disc 14 with respect to the axis of the pump assembly.

Each of the pump chambers 10 formed in the pump barrel 5 is made to communicate through a radially extending duct 17 extending from the lower end of the pump chamber 10 with a common axial bore formed in the barrel. Mounted in this axial bore is a fixed recessed distributor valve member 18. Valve member 18 is formed with two recesses therein conformed in a manner which will now be described with reference to Figs. 1 and 2. A first or upper recess 19 in valve member 18 has a generally axially extending portion whose upper end opens centrally of the cylinder member 9a on top of casing member 9 and whose lower end portion merges over an arcuate section with a radially directed orifice 19a opening out through the periphery of the valve member 18, the orifice 19a having an arcuate length, as measured circumferentially of the cylindrical outer surface of valve member 18, slightly less than one half the circumferential length of said cylindrical surface minus a length equal to the diameter of one of the afore-mentioned radial ducts 17. Orifice 19a is so located along the axial length of valve member 18 as to be adapted, on rotation of the pump barrel 5 to register with successive ones of said radial ducts 17. The other or lower recess 20 formed in valve member 18 is generally similar in shape to that of upper recess 19, in that it includes an axial portion opening into the lower end of the valve member centrally thereof, and a radial orifice portion 20a merging with the axial portion over an arcuate section, the orifice 20a being equal in circumferential extent to that of orifice 19a and opening into the outer surface of valve member 18 at a position diametrically opposite to that of said orifice 19a, as clearly shown in Fig. 2. The lower or axial end of recess 20 at all times communicates with an axial duct 21 formed through the lower part of barrel member 5 in the section thereof merging integrally with shaft 4, the lower end of axial duct 21 communicating through one or more outwardly extending ducts (of which two are shown in Fig. 1) with a free space defined in the bottom of lower casing member 6 adjacent the previously mentioned ports 7 so as to communicate freely with the liquid contained in the surrounding pump.

Slidably arranged in cylinder 9a is a piston 22 having a connecting rod 23 attached thereto. An auxiliary line 24 may further be connected with the bottom of cylinder 9a through a suitable union provided with a control valve (not shown), whereby one or more additional hydraulic cylinder-and-piston units may if desired be connected for actuation by the fluid pressure developed by the pump assembly just described.

The above described variable delivery pump assembly operates as follows:

With lever 16 in the full-line position shown in Fig. 1, disc 14 is so inclined with respect to the pump axis that the pistons 12 at each revolution of the barrel member 5 will be caused to perform one complete reciprocation in their respective cylinder chambers 10. As each piston 12 rises under the action of its spring 11, the corresponding duct 17 is caused to register with the orifice 20a. Liquid will then be drawn in through axial recess 20 and ducts 21 from the lower casing member 6. As the piston 12 reaches its maximum elevation in cylinder chamber 10, the corresponding port 17 is intercepted by the land section 18a at the lower end of valve member 18, and thereafter registers with the opposite orifice 19a as the piston initiates its downward stroke. Oil is thus discharged through recess 19 into cylinder 9a. The piston 22 reciprocable in this cylinder is thus subjected to oil pressure and exerts an axial thrust on connecting rod 23 as indicated by arrow F.

Now assuming the lever 16 has been moved to its position 16' (Fig. 1), disc 14 is caused to assume a position normal to the axis of the barrel 5, and the pistons 11 are prevented from axial reciprocation in their cylinder chambers 10 during rotation of barrel 5, so that no liquid is supplied into the upper cylinder 9a and the piston 22 retains a stable stationary position therein.

Assuming further that lever 16 has been placed in the position 16", the disc 14 will be angled in a direction reverse from that shown in Fig. 1. This will result in a reversal of the direction of flow of oil, whereby oil is drawn in from upper cylinder 9a and discharged into the lower casing. The piston 22 is then actuated in an axial direction opposite from that indicated by arrow F.

If it is now assumed that the piston 22, when actuated in the direction indicated by arrow F, exerts a force tending to raise the tool, it will be understood that when the operator desires to raise the tool, it will simply be necessary for him to place the lever in the position 16; when it is desired to hold the tool stationary, the lever is placed in position 16', and when desired to lower the tool, the lever is shifted to position 16". It should be noted that in this last mentioned instance, i. e. when the lever is moved to 16", the weight of the tool acting on piston 22 will cause oil under pressure to be discharged into cylinder chambers 10, so that during the tool lowering operation, the barrel pump operates as a receiver. A certain amount of power, which may be quite substantial, will thus be transmitted by the shaft 1 to the motor to assist the latter, especially at the time the tool is being dug into the earth.

Figs. 4 to 7 illustrate a modified construction of the variable delivery pump. Herein, the pump operates to generate a constant volume and a variable fraction of this volume is effectively used for fluid displacement. In the modified construction of these figures, the pump is enclosed within an outer casing 25 having an oval cross sectional contour on a plane normal to the axis. Rotatably supported within this casing is a tubular shaft 26 driven from the tractor power takeoff and having secured to or formed integrally with the periphery thereof an odd number (three in the example shown) of angularly equispaced, radially-projecting cylinder members 27.

Slidably arranged in each cylinder member is a piston 28 having a roller 29 rotatably supported from its radially outer end, said rollers riding in an annular groove formed in the inner wall of casing 25 and urged outwards thereagainst by centrifugal force preferably supplemented by compression springs 31 as shown.

Owing to the oval form of casing 25, at each revolution of shaft 26, each piston 28 will perform two full reciprocations in its cylinder. Arranged within the tubular shaft 26 is an angularly adjustable distributor member or pintle 32 in the form of a recessed cylinder formed with a pair of intake ports 34 and a pair of outlet ports 35, arranged in the manner shown assuming the pump assembly is rotated in the clockwise direction as indicated by the arrow 33 in Fig. 5. Owing to the provision of the ports 34 and 35, the pintle 32 presents the configuration of a four-armed spider or cross having four lands adapted to register with the cylinder orifices. The intake ports 34 communicate through ducts 36 with the external fluid medium in which the pump assembly is immersed. Outlet ports 35 communicate through ducts 37 with an axial bore 38 formed in the pintle 32. This bore is sealed at its outer end with a plug member 39 having its outer end formed with gear teeth to define a piston 39a cooperating with a rack member 40 retained by means of sliding bearing guide members 41 in meshing engagement with pinion 39a. At the same time, the bearing members 41 provide abutment means adapted to engage a projection 40a depending from the rack member 40 to limit the displacement of the latter in both directions. One end of rack member 40 is formed with a pivot 40b adapted to have a suitable operating means, not shown, attached thereto, for adjusting the longitudinal position of the rack member and thereby adjusting the pintle 32 in angular position about its axis.

The cavity defined by axial bore 38 in the pintle inwardly of plug member 39 opens outwardly of the valve member through a semi-circular slot 42 formed in the wall of said member into an arcuate recess 43 formed in a fixed ring 44. The recess 43 communicates through a conduit 45 with a suitable receiver motor such as a hydraulic jack. Moreover, ring 44 is formed with a radially extending duct 46 opening outwardly thereof into the surrounding liquid medium in which the pump assembly is immersed.

The above described pump assembly operates as follows:

As shaft 26 is rotated, and assuming the pintle 32 is in the position shown, each of the pistons 28 draws in liquid through the ports 34 and discharges it through ports 35, ducts 37, bore 38 and into conduit 45. The entire volume generated by the displacement of the pistons in the pump thus corresponds to a certain amount of liquid all of which is discharged into the utilization circuit. Supposing the pintle 32 is rotated 45 degrees in the direction of arrow 48, it will be seen that, even though the pistons 28 still perform their full reciprocating stroke, the average amount of fluid effectively discharged by the pump during each cycle will now be zero, since the relative timing of the suction and discharge periods is now such that each piston will draw in and discharge equal amounts of fluid from the intake ports and into the discharge ports respectively. This result is achieved by imparting to the extremity 40b of rack member 40 the position 40b' shown in dotted lines in Fig. 7. This is the idling or neutral condition of the pump, wherein no fluid under pressure is supplied to the receiver. Evidently for intermediate angular adjustments of the valve member, the rate of discharge will be somewhere between zero and the maximum value thereof.

On further angular displacement of valve member 32, the slot 42 will register with port 46 and liquid will be allowed to flow freely from the receiver through this discharge port whereby the tool will be lowered under its own weight.

Thus it will be seen, in brief, that in either of the above described modifications the pump discharge controlling member can be made to occupy different angular positions respectively corresponding to the three following effects:

In a neutral position, in which lever 16 occupies position 16' (Fig. 1) or rack member 40 occupies position 40'b (Fig. 7), the total exchange or transfer of fluid between the receiver and the fluid supply is zero.

In an intermediate range of positions between the neutral and the maximum discharge position (corresponding to position 16, Fig. 1, or 40b, Fig. 7), fluid is effectively supplied to the receiver, whereby the tool is raised.

In a range of positions intermediate between neutral and a minimum discharge position (16" Fig. 1, or 40"b, Fig. 7), fluid is drained from the receiver, whereby the tool is lowered.

For convenience, the neutral position will be hereafter referred to as position N, the maximum discharge position as position R, and the minimum discharge as position T.

In the diagrammatic side view of Fig. 8, the rear frame section of a tractor 49 is shown having drive wheels 50 and supporting a tool 51, schematically illustrated, having its supporting end pivoted on a transverse axis 52. The tool is adapted for up and down actuation by means of the connecting link 53. Actuating link 53 is operated through lever 54 pivoted thereto, by means of a hydraulic lift device as presently described. In this diagrammatic and simplified showing the operating connection between the tool and the tractor has been shown in a highly simplified form. It will of course be understood that the said connection may actually be designed and constructed in any suitable manner, as for instance involving a well-known type of three-point linkage.

The pivot 52 on which tool 51 is pivoted, rather than being directly supported from the tractor frame, is secured on one or more arms such as 55 secured on a shaft 56 mounted for rotation relative to the frame. The free end of each lever arm 55 has a pair of springs or groups of springs 57, 58 attached thereto so as to provide a dynamometer arrangement whereby deformation of the spring means will provide an indication of the draft force exerted by the tractor on the tool. Manual levers 59, 60 are provided for adjusting, in a manner to be later described, the position of the tool. A feeler member 61, preferably adjustable in length, is pivoted as at 62 to the tractor frame and has its lower end 61a contacting the ground in dragging relationship therewith. The relative position of the feeler 61 with respect to the tractor frame is used, in a manner to be described with reference to Fig. 11, for controlling the movements of the tool in response to the variations in the relative position of the feeler. Instead of the feeler directly engaging the ground, the end of the feeler may alternatively be made to follow some suitable reference line or surface, such as a cable stretched over the ground or a rail resting on the ground, etc.

Fig. 9 illustrates details of the assembly just described in the case it is desired to control the tool position manually. This figure shows clearly the mutual relationship between the various components described with reference to Fig. 8.

It will be seen that the crank arm 54 is secured to a shaft 63 which further has secured thereto a further crankarm 64 the outer end of which bears a socket cooperating in swivelling relation with a ball formed at the end of the connecting rod 23 mentioned in connection with Fig. 1. Further secured to shaft 63 is a further crankarm 65 to which is pivoted one end of a link 66 having its other end pivoted as through a clevis 85 to one end of a differential lever 67. Lever 67 is pivoted at a point intermediate its ends on a pair of pins 68 oppositely projecting from a bush 69 slidably mounted on a rod 70 having one end pivoted to the free end of lever 16 (also see Fig. 1). Bush 69 is retained between a pair of oppositely acting springs 71 and 72 having their outer ends abutted against stop members 73 secured on the rod 70. The free end of differential lever 67 is connected to one end of a link 74 the other end of which is pivoted on a crankarm 75 projecting from one end of a tubular shaft 76 (see Fig. 10) the other end of which has welded thereto the annular hub portion of hand lever 60. Tubular shaft 76 is rotatable about a fixed shaft 77 provided at its free end with a nut 78 and a spring 79 is interposed between the nut and the hub of lever 60. The lever 60 is thus urged, through an interposed friction washer 80, against the hub of hand lever 59. The arm of this lever 59 is formed with a hole 81 adapted to receive therein a pin 82 projecting from a sector 83 across which both hand levers 59 and 60 are adapted to be operated. Sector member 83 may be made of a round steel section element or the like. Actuating levers 59 and 60 are preferably formed from sheet-steel and possess a certain degree of flexibility to bending forces exerted normally to their plane, so that by exerting a lateral stress on hand lever 59, this lever may be disengaged from pin 81 and then rotated about the tubular shaft 76. This feature will be more fully described in connection with Fig. 11. The system just described operates as follows:

Assume the system as a whole is in a condition of equilibrium in the position illustrated for the respective parts in Fig. 9, that is, with lever 16 in its neutral position N while hand lever 60 and crankarm 65 are in the positions shown in the figure. If operating lever 60 is now shifted in the clockwise direction shown by arrow 84 against the frictional force exerted thereon by spring 79 through washer 80, differential lever 67 will be rotated about the pivot 85 connecting said lever with link 66. Link 70 is thus urged through spring 72 to bring lever 16 to the position thereof designated T.

The dimensions of the leverage are so predetermined that a small clockwise displacement of lever 60 will bring lever 16 as far as the position T, while the balance of the displacement of lever 60 remains, so to speak stored in potential form as a deformation of spring 72. This provision has a twofold advantage. First, a small displacement of lever 60 will suffice to bring lever 16 to either one of its endmost positions (R or T), this making for a very rapid response of the pump. Then, in case where lever 60 is subjected to very large travels, such travels will, rather than being restricted by the stops 113 of lever 16, be stored as potential energy in either of the springs 71 or 72.

With the previously made assumption that lever 16 was moved to position T, the tool 51 is lowered, that is, shaft 63 is rotated counterclockwise, thereby causing lever 67 to pivot clockwise about its pivotal connection 86 with link 74, until the central portion of differential lever 67, including pivots 68 thereof, has been brought to a position spaced from pivot 87 an equal distance to its previous spacing therefrom in the initial position of the lever; during this movement, spring 72, if previously compressed, has expanded. In other words, the tool 51, in performing the movement imposed thereon by displacement of lever 60, restores the lever 16, which, be it remembered, is the means controlling the rate of discharge of the pump, to its neutral position wherein said rate of discharge is zero. Thus to each position of lever 60, there corresponds one, and only one, position of the tool 51. Thus it is seen that differential lever 67 provides in effect a follow up action.

It will readily be understood that a counterclockwise displacement of lever 60 will cause reverse movements of the various parts.

It is important to note that any selected position or setting is positively retained, inasmuch as the lever 60 is blocked by friction, in the position imparted thereto, against lever 59, while lever 59 in turn is prevented from rotating owing to the lock pin 82.

In order to facilitate returning the tool to any position previously determined therefor by a trial and error procedure, by means of lever 60, sector 83 is provided with a settable stop 90 slidably adjustable along the sector and lockable in any selected position as by means of the winged set-screw shown. Thus, by moving lever 60 back into engagement with this stop, the tool will have been restored to its previous position.

If it is desired to determine the position of the tool with respect to a reference surface (Fig. 11), the feeler 61 pivoted at 62 is connected as through the link 88 with a lug projecting from the circular hub portion of lever 59, said lug being formed with an aperture for pivoting the adjacent end of link 88 thereon with a pin 89. Lever 59, after having been released from lock pin 82, can then be rotated freely about the axis 77. Both levers 59 and 60 are as previously noted rotated as a unit together owing to the friction member 80, so that the movements of feeler 61 about its pivot 62 are transmitted through lever 59, friction member 80 and lever 60 to the link 74, just as in the previously described instance relating to manual control. As there described, link 66 has its lower end pivoted to the opposite end of differential lever 67. Lever 67 is therefore caused to respond both to the position of the tool through linkage 66 and to the position of the feeler through linkage 74. The system is in equilibrium only in the condition where lever 16 occupies its neutral or central position N. As the lever 16 is made to approach either of its end positions R or T, the tool will move up or down until a point where lever 16 will have been restored to neutral position N through the previously-described follow-up action of differential lever 67.

The relative position between the feeler and the tool may very easily be adjusted, when desired, simply by altering manually the angular spacing between levers 59 and 60, whereby the point of engagement 61a of the feeler with the reference surface may be adjusted with respect to the position of the soil engaging parts of the tool.

In the arrangement for automatically controlling the tool position illustrated in Figs. 9 and 11 and above described, it will be noted that the operation of dynamometer springs 57—58 was disregarded, and hence the pivotal point 52 at which the tool is connected to the tractor frame could be regarded as stationary. In the device shown in Fig. 12 on the other hand, and now to be described, it is the dynamometer spring device 57—58 (in turn influenced by the draft force) which is utilized to control the tool position. The dynamometer springs 57—58 slide upon a rod 91 having its ends secured to lugs 92 depending from the frame of the tractor. A pair of depending arms 55 are pivoted as at 56 to the tractor frame on the opposite sides thereof and both tool coupling members 51 are pivoted at 52 to the respective arms 55 below the pivots 56. Arms 55 are interconnected by a bushing 93 provided with oppositely projecting journal pins 94 journalled in the ends of the respective arms, while bushing 93 is arranged to slide with a large clearance on the rod 91 between the two springs 57, 58.

Thus it will be seen that whenever a pulling force is exerted on the tool, spring 57 is compressed and arms 55 are rocked clockwise about the pivot shaft 56. Keyed to and projecting from the pivot shaft 56 is a lever arm 95, and pivoted as by means of a clevis to the free end of arm 95 is one end of a link 96 extending at its other end through a bush 98 provided with projecting journal pins 98a pivoted to differential lever 67 adjacent that end thereof which has link 66 pivoted thereon. It is noted that in the construction now being described, link 66 is formed in a peculiar manner to be later described.

Around link 96 is a stress-limiting coil spring 97; the action of this spring is such that the movements of arm 95 are integrally transmitted to balance lever 67 so long as the resistant force to be overcome for pivoting lever 67 remains lower than a predetermined value as determined by the pre-set compression of spring 97. Should the resistant force exceed such value, spring 97 will yield, allowing rod 96 to slide inside its end bushing 98, so that spring 97 is compressed without producing any displacement of differential lever 67.

Rod 66 extends through a bore formed radially through a bush 99 (Figs. 13 and 14) pivoted to the end of arm 65. Rod 66 is moreover provided with a stop member 100 adapted to limit travel of the rod in the bush 99. In this abutted condition, the operating lever 59 is locked by engagement thereof with lock pin 82, so that any manual setting of the lever 60 will be retained thereby and the pivot 101 of link 74 may now be regarded as fixed, apart from any manual adjusting action that may be performed.

Assume the system is in equilibrium in the condition of the parts illustrated in Fig. 12. The tool is working at a given depth in the ground. Should the draft force exerted by the tool at any time increase, due for instance to increased hardness in the consistency of the ground or a hump or the like on the surface of the ground over which the tool is travelling, the arms 55 will rock clockwise with the shaft 56 and differential lever 67 will be swung clockwise about the point 86 as a fulcrum, bringing lever 16 to its R position. This results in an upward movement of the tool and a consequent reduction in the draft force which in its turns rocks arm 55 in the opposite direction and lever 67 is brought to a final position such that lever 16 is restored to its neutral position N. A new condition of equilibrium has thus been established. Conversely, in the event of a decrease in the tractive force, lever 67 is swung about point 86 as a fulcrum in a counterclockwise direction tending to move lever 16 towards its T position, resulting in the tool being dug deeper into the ground and the draft force being increased, until a depth is finally reached at which lever 67 has restored lever 16 to its neutral position.

During the different above-described movements, rod 66 slides back and forth in the bushing 99. The position of the tool with respect to the tractor frame does not, therefore, exert any influence upon the position of lever 67. However, if lever 60 is moved manually counterclockwise fully to its leftward end position, which action, as previously described, causes the tool to be raised through movement of lever 16 towards its R position, then, as soon as the tool has been lifted out of the ground, no further alterations in the position of arms 55, and hence of the left-hand end of differential lever 67, can occur. The upward movement of the tool would therefore tend to continue indefinitely since the dynamometer device is no longer able to restore the lever 16, through the medium of lever 67, to neutral.

This adverse condition is overcome by the fact that, during the tool raising movement, bush 99 is adapted to engage stop 100 on rod 66 and, through said engagement, cause differential lever 67 to swing about point 86 until a point where lever 16, which is in its R position, has been restored to its N position, whereupon the upward movement of the tool is discontinued. During the last stage of the movement just described, spring 97 is compressed and rod 96 slides in bush 98.

With the purpose of enabling the device to be selectively operated in the manner described with reference to Fig. 9, or in the way described with regard to Fig. 12, crank arm 65 is preferably formed in the manner shown in detail in Figs. 13 and 14. As shown, bush 99 is adapted to slide axially under the action of a forked lever 102 pivoted about pin 103 journalled in lugs projecting from the crank-arm. One end of forked lever 102 projects into an axial bore formed in the shaft 63 on which the tool-raising crank-arm 54 is keyed for rotation therewith. The said projecting end of the forked lever 102 engages with a notch 104 formed in a plunger 105 reciprocable in the bore in shaft 63. Plunger 105 is operable by means of a knob 105a or the like. Plunger 105 is further provided with two further notches 106a and 106b in a side thereof, with which is selectively engageable a detent ball member 107 provided with a detent spring 108. Bush 99 is formed with a round bore 109 through which the cylindrical part of rod 66 can slide, and the bore 109 further has a slot-like extension 110 connecting therewith and extending axially of the bush 99 adapted to receive therein a machined flattened portion 111 of rod 66.

In the condition shown in the figures, the device is adapted to operate in the manner described above in connection with Fig. 12. If, on the other hand, with the tool in its raised position, knob 105a is pulled out so that slot 110 of bush 99 has engaged the reduced part 111 of rod 66, rod 66 is positively connected with crank arm 65 for unitary movement therewith. The device is then adapted for rotation in the manner previously described with reference to Figs. 9 and 11. In this condition, the differential lever 67 is positively controlled by rod 66 and the spring 97 is compressed under the force exerted by said rod, so that the dynamometer device is then inoperative. The dynamometer device nevertheless exerts a beneficial function even in this condition, in that it serves as a shock-absorber for the draft coupling; however it does not influence the position of the tool.

Similarly, by releasing the lever 59, a feeler may be used as shown in Fig. 11. Actually, the complete assembly shown in Fig. 12 makes selectively possible either manual control or automatic control by means of a reference surface, or further automatic control by the draft force. In the first case, lever 59 would be retained in latched condition, and knob 105a in its pulled-out position. In the second instance, the feeler member is mounted and lever 59 is released from latchpin 82. In the third instance, lever 59 is again latched to pin 82 and the feeler is removed, and knob 105a pushed in.

It will thus be seen that any one of the above described types of operation may be selected by means of only a few and simple steps of operation.

It will of course be understood that many modifications may be made in the details of the structure and steps of operation described without exceeding the scope of the invention as defined in the ensuing claims.

What I claim is:

1. In an agricultural machine, in combination, an adjustable tool, means for moving the machine over the ground with the tool at a variable position with respect to ground surface; power means and variable delivery pump means driven thereby; fluid-operated means connected with the pump means for operation thereby and with the tool for adjusting position thereof; a control member for controlling effective pump delivery; differential mechanism comprising two movement inputs and a movement output, said control member connected with said output; dynamometer means responsive to the draft force exerted on the tool when the tool is below ground surface; means yieldably connecting said dynamometer means with one of said differential inputs for follow-up response thereof to tool draft force when the tool is below ground surface; lost motion means connecting the tool with said one input for follow-up response thereof to tool elevation when the tool is nearing its uppermost position above ground surface; and hand control means for determining tool position and connected with the other of said inputs.

2. In an agricultural machine, in combination, an adjustable tool; means for moving the machine over the ground with the tool at a variable position with respect to ground surface; power means and a variable delivery pump driven thereby; fluid-operated means connected with the pump for operation thereby and with the tool for adjusting tool position, a control member for controlling effective pump delivery, differential mechanism having two movement inputs and a movement output, said output connected with said control member; dynamometer means responsive to draft force exerted on the tool when the tool engages ground surface; a first connection between the dynamometer means and one of said inputs; a second connection between the tool and said one input; manual means for alternatively enabling either one of said two connections while disabling the other whereby said one input can be connected either for direct follow-up response to tool position through said second connection or for follow-up response to tool draft through said dynamometer means and said first connection, hand control means for determining tool position and connected with the other of said inputs; feeler means adapted to follow a reference surface; and removable means for connecting said feeler with said other input.

3. An agricultural tractor comprising a motor, attaching means including dynamometer means for pivotable connection of implements to said tractor; a variable-delivery fluid pump driven by said motor; a lift cylinder in fluid relationship with said fluid pump for actuation thereby; a lift linkage operable by said lift cylinder and connectable to said implements; a control member for controlling fluid delivery from said pump having a neutral position in which said delivery is zero and at least two other positions on either side of this neutral position for respectively supplying or withdrawing liquid to or from said cylinder; two hand control levers coaxially rotatable and provided with attaching lugs; locking means for preventing rotation from the first of said levers; friction means between said levers for ensuring simultaneous rotation therefrom; a differential lever having at least three hinge points; a first yielding linkage between the medial of said hinge points and said control member; an uncollapsible linkage between the lug of said second hand lever and another hinge point of said differential lever; a second yielding linkage between said dynamometer means and the third hinge point of said lever; feeler means adapted to contact a reference surface connectable to the lug of said first hand lever; lost motion means connecting said lift linkage to said third hinge point; and hand actuated coupling means for transforming said lost motion means in positive connection.

References Cited in the file of this patent
UNITED STATES PATENTS

| | | |
|---|---|---|
| 1,081,810 | Carey | Dec. 16, 1913 |
| 2,356,231 | Ferguson | Aug. 22, 1944 |
| 2,462,500 | Hoffer | Feb. 22, 1949 |
| 2,465,510 | Bonnafe | Mar. 10, 1949 |
| 2,567,107 | Gobeil | Sept. 4, 1951 |
| 2,611,307 | Strehlow et al. | Sept. 23, 1952 |
| 2,616,350 | Robinson et al. | Nov. 4, 1952 |
| 2,618,167 | Seifert | Nov. 18, 1952 |
| 2,621,575 | Berg | Dec. 16, 1952 |
| 2,622,499 | Fraga | Dec. 23, 1952 |
| 2,631,514 | Roeder | Mar. 17, 1953 |
| 2,631,515 | McRae | Mar. 17, 1953 |

FOREIGN PATENTS

| | | |
|---|---|---|
| 915,750 | France | July 29, 1946 |
| 988,477 | France | May 2, 1951 |
| 988,478 | France | May 2, 1951 |
| 520,484 | Great Britain | Apr. 25, 1940 |
| 541,436 | Great Britain | Nov. 26, 1941 |